United States Patent [19]
Lautzenhiser

[11] Patent Number: 5,270,624
[45] Date of Patent: Dec. 14, 1993

[54] APPARATUS AND METHOD FOR ENHANCING TORQUE OF POWER WHEELCHAIR

[76] Inventor: John L. Lautzenhiser, 0694 State Rd. 427, Hamilton, Ind. 46742

[21] Appl. No.: 889,862

[22] Filed: May 28, 1992

[51] Int. Cl.⁵ .................................................. H02P 7/06
[52] U.S. Cl. ................................. 318/432; 318/139; 318/599
[58] Field of Search ............... 318/139, 430, 431, 432, 318/433, 434, 599

[56] References Cited

U.S. PATENT DOCUMENTS

| | | | |
|---|---|---|---|
| 3,662,245 | 5/1972 | Newell | 318/696 |
| 4,217,527 | 8/1980 | Bourke et al. | 318/139 |
| 4,227,127 | 10/1980 | Fukaya et al. | 318/459 X |
| 4,300,081 | 11/1981 | Van Landingham . | |
| 4,303,874 | 12/1981 | Iwai . | |
| 4,361,788 | 11/1982 | Melocik . | |
| 4,387,325 | 6/1983 | Klimo . | |
| 4,859,924 | 8/1989 | Chonan | 318/808 |
| 4,995,478 | 2/1991 | Oshima et al. | 187/115 |

Primary Examiner—Bentsu Ro
Attorney, Agent, or Firm—Wendell E. Miller

[57] ABSTRACT

A power wheelchair (10) includes wheels (12a and 12b) that are reversibly driven by electric motors (24a and 24b) included in respective ones of electric motor drives (170). The electric motor drives (170) provide driving voltage pulses (142) of a pulse-width-modulated driving voltage (144) to respective ones of the motors 24a and 24b), and the electric motor drives (170) provide dynamic braking pulses (150) that are interposed intermediate of respective ones of the driving voltage pulses (142). The maximum width (146) of the driving voltage pulses (142) is selectively adjusted by a removable speed control knob (46) that is connected to a pair of ganged maximum speed potentiometers (48), thereby adjustably determining the maximum speed of the conveyance (10). The maximum torque of the power wheelchair (10) is selectively adjusted by a removable torque control knob (50) that is connected to a pair of ganged torque enhancement controls (52). Torque enhancement is achieved by sampling torque of each of the motors (24a and 24b) during a selected portion (190) of constant time periods (148) of the pulse-width-modulated driving voltage (144). Sampling of motor torque is done subsequent to a dynamic braking pulse (150) and prior to a driving voltage pulse (142) in a delay (164) for a portion (190) of a constant time period (148).

41 Claims, 5 Drawing Sheets

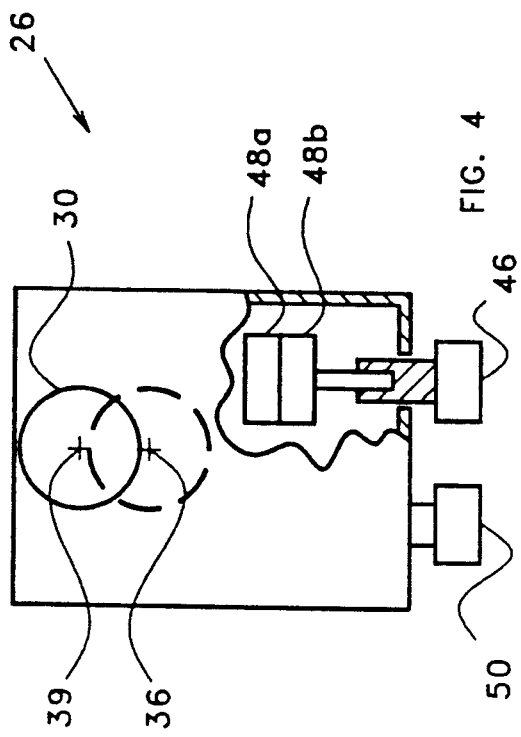
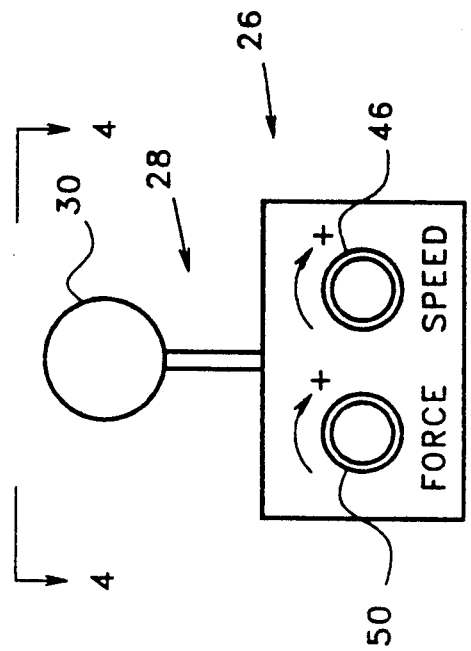
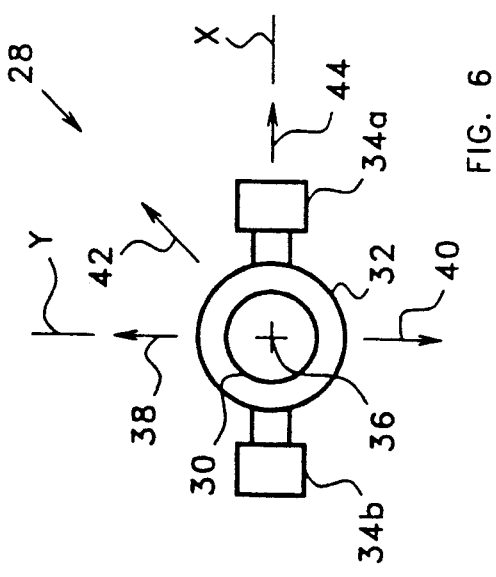
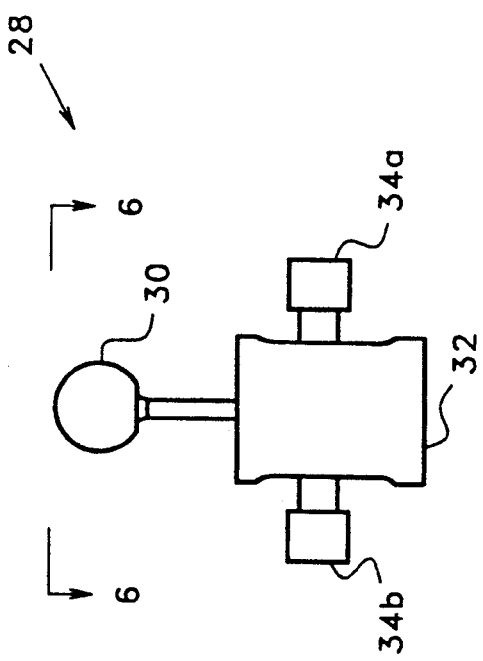

APPARATUS AND METHOD FOR ENHANCING TORQUE OF POWER WHEELCHAIR

BACKGROUND OF THE INVENTION

1. Field of the Invention

The present invention relates generally to electrically propelled wheelchairs. More particularly, the present invention relates to apparatus and method for selectively adjusting both maximum speed and maximum torque of first and second motor drives that propel and steer electrically powered wheelchairs.

2. Description of the Related Art

Electrically propelled wheelchairs provide mobility to those who cannot walk, thereby helping them to partially overcome their physical disabilities. This makes the physically handicapped more productive, and it gives them a greater sense of purpose and satisfaction with life.

Having a suitable power wheelchair is especially important for children who cannot walk and will never be able to walk, and who are unable to use a manually-propelled wheelchair. When provided with power wheelchairs that they can operate satisfactorily, small children blossom in their personality development, in their mental development, and in their total outlook of life.

As can be easily understood, their power wheelchair becomes an integral part of their life, so integral in fact, that it becomes almost a part of them. With it, they have the ability to move from place to place. They are a person with the ability to enter in and be a part of activities surrounding them. Without it, they are doomed to be placed on the floor or on a chair, feeling more like a piece of the furniture than a person.

This importance of a power wheelchair to a child places stringent requirements on reliability, maintenance costs, low weight, and ease of control.

Power wheelchairs must, as nearly as possible, be maintenance free. Obviously, even limited times without the use of his power wheelchair seems to be an unbearably long time to a child. Further, if a child has never walked, and will never walk, this mobility must not be taken away from him when he is outdoors. He must be able to use his wheelchair outdoors, and he will be caught out in rain showers from time to time. Therefore, the electrical and electronic system of his power wheelchair must be impervious to sun, rain, dust, and mud.

Parents of handicapped children are typically made poor by the medical expenses that they have occurred in the past, and/or they are kept poor by continuing medical costs. While help is usually available for the original purchase of power wheelchairs for those needing them, costs to repair poorly designed power wheelchairs can be too expensive for parents to keep their child's power wheelchair operating.

Weight of the power wheelchair must be as low as possible, thus system efficiency must be high, so that battery weight can be low. Further, it must be possible to remove and replace the battery in a few seconds. A van with a lift can transport a heavy power wheelchair, but for a wheelchair to meet a child's needs, it must be light enough to be carried up the stairs of his grandmother's house.

Typically, an electrically powered wheelchair is controlled by a manually-actuated X-Y controller. That is, the power wheelchair is controlled by moving a control handle forward from a neutral position for forward propulsion, rearward for rearward propulsion, forward and to the right for a right turn, and to the right for a pivot turn in which one wheel rotates in one direction and the other wheel rotates in the other direction. In all of these maneuvers, the speed of movement should be proportional to movement of the control handle from the neutral position.

Other types of controls have been used, and are used, for children, adults, and older adults who do not have the strength or manual dexterity to operate this type of manual control. However, children who are able to use an X-Y controller, and their parents, obtain great satisfaction from this accomplishment.

Typical prior art X-Y controllers have utilized two electrical potentiometers disposed at 90 degrees to each other and disposed at 45 degrees to X and Y axes. Because of this geometry, movement of the control handle forward along the Y axis to a maximum forward propulsion position has produced rotation of both potentiometers that is a function of the sine of 45 degrees, thereby producing only about 70 percent of the maximum output of both potentiometers and about 70 percent of the maximum speed of both motors.

However, in response to maximum movement of the control handle in a direction that is forward and 45 degrees to one side of the Y axis, this movement of the control handle has produced an output of one potentiometer and a speed in one motor that is a function of the sine of zero degrees, or zero. This same control handle movement has produced an output of the other potentiometer and a speed in the other motor that is a function of the sine of 90 degrees, thereby producing a speed of 100 percent of maximum.

Therefore, when attempting to negotiate turns, this type of X-Y controller has caused the wheel on the outside of the turn to increase in speed by 41 percent, making turns difficult to control. This same characteristic of this type of X-Y controller has made power wheelchairs unduly sensitive to turns, making it difficult to even steer the wheelchair in a straight line.

This control problem was overcome by an X-Y controller shown and described in U.S. patent application Ser. No. 07/590,876 by the inventor of the present invention. This X-Y controller never produces, in response to any angle of movement of the control handle, an output that is greater than movement of the control handle along the Y axis. In addition, this improved controller produces maximum electrical outputs that are selectively-chosen percentages of X axis inputs.

Finally, especially for power wheelchairs used by children either attending school or having young brothers or sisters, and for power wheelchairs used by adults in nursing homes, both maximum speed and maximum torque of the power wheelchairs must be carefully limited. Otherwise, those using the wheelchair may become a danger to others, whether to children playing on the floor, or to ambulatory geriatric patients.

As is well-known, the speed of D.C. motors is highly load sensitive. Feedback can be used from the electric motors making the electrical drive system entirely dependent upon the selective positioning of the unitary control. However, a system in which speed is entirely unrelated to forces placed upon it by obstacles placed in its way can be dangerous to others and hazardous to various pieces of equipment and furniture, including the power wheelchair.

Further, if no feedback is used, and if the maximum speed of the wheelchair is adjusted on a hard and level surface to a suitable range for pediatric or geriatric use, the wheelchair may not have sufficient power for use on a carpet, on unpaved ground, or up an incline.

Also, if the system has means for reducing the ratio of electrical output to mechanical input when making turns, such as the X-Y controller of U.S. patent application Ser. No. 07/590,876, the effective driving voltage to the motor powering the wheel on the outside of the turn will be reduced when making turns. Thus, when attempting sharp turns, or pivot turns, there may be insufficient power to achieve the desired maneuver, and the power wheelchair may stall.

In addition, it can be understood that, for different children or adults, different maximum speeds and different maximum torque levels are imperative. Also, at different times, and under different conditions, a given child or adult will need his wheelchair set to different limits of speed and torque. Thus, it is important, not only for physical therapists, but also for parents or other family members, to be able to reset the maximum speed and/or maximum torque at any time without special equipment or expertise.

Therefore, while the prior art includes digital designs that are programmable by factory-trained experts, these designs do not meet the criteria for ease of adjustment by health care personnel and family members. Further, while the prior art has adjusted operating parameters by digital means while the wheelchair was stationary, both maximum speed and maximum torque can most easily and most accurately be adjusted while the wheelchair is operating on various surfaces, on various inclines, or in various maneuvers. Further, analog adjustments are much more conveniently made than digital adjustments, and an ideal system includes means for easily and quickly activating and deactivating the ability to make changes in maximum speed and torque.

Prior art digital controls have been used, but they have failed to meet the requirements for pediatric power wheelchairs in that they have been relatively poor in reliability, have been sold with short warranty times, have been excessively high in maintenance costs, and have been prone to failure even when exposed to only moderate rain showers.

Finally, since the current flow of an electric motor is a function of the torque load placed on the electric motor, typically, torque sensing has been achieved by placing a resistor in series with the electric motor. In order to minimize power loss in this load-sensing resistor, a very low resistance, sometimes in the order of 0.01 ohms, has been used. Melocik, in U.S. Pat. No. 4,361,788, and Klimo, in U.S. Pat. No. 4,387,325, are typical of the prior art.

With the load-sensing resistor placed in series with the electric motor, this resistor senses motor current without regard to time or function of the motor. More particularly, if the driving voltage is a pulsed voltage, whether of pulse duration or pulse frequency type, sensing is done at all times, both during times in which the driving voltage pulses are being delivered to the electric motor and intermediate of the driving voltage pulses.

Therefore, this type of sensing, if used with a low load-sensing resistance, produces a very low signal which is subject to corruption by noise voltages. But, if used with a higher load-sensing resistance, the resistance wastes power excessively and decreases the operating time of the battery between charges. Further, since torque sensing of the load resistor continues both during driving pulses and the spaces therebetween, the torque signal, which is already too low, and which must be amplified too much to produce the best results, is contaminated by being mixed with a signal taken during times in which the pulses of driving voltage are not being supplied to the electric motor.

SUMMARY OF THE INVENTION

In the present invention, a motor-torque-sensitive signal is obtained during a small part of the time period of a pulse-width-modulated driving voltage, and this signal is used to enhance the torque of the motor by increasing the width of the pulses of driving voltage.

More particularly, in the present invention, pulses of a pulse-width-modulated driving voltage are delivered to an electric motor, and the electric motor is shorted between pulses of the driving voltage to provide dynamic braking as taught by Lloyd L. Lautzenhiser, et al. in U.S. Pat. No. 4,906,906.

Maximum speed of the power wheelchair is selectively adjusted by a maximum-speed knob that controls two potentiometers. The potentiometers proportionally reduce outputs of an X-Y controller, thereby providing selective adjustment of maximum speed of the power wheelchair.

Preferably, in order to allow manual propulsion of the power wheelchair without the weight of a mechanical mechanism to disengage the wheels from the power drives, both the mechanical drive and electronic circuitry taught by Lloyd L. Lautzenhiser, et al. in U.S. Pat. No. 4,978,899 are used.

Considering the circuitry of only one of the two mechanical drives, in the present invention an NPN transistor, with its collector connected to the motor and with its emitter connected to ground via a capacitor, is made conductive slightly before a field effect transistor (FET) closes a motor drive circuit from the motor to ground. This difference in timing is accomplished by utilizing the inherent capacitance of the FET and a resistor to increase the switch-on time of the FET.

In the short time interval between the NPN transistor conducting and the FET conducting, a torque-sensitive circuit is provided between the motor and ground via the general purpose transistor and the capacitor. The potential of this capacitor is summed with a signal that is responsive to the manual control, to increase the pulse width of the driving voltage pulses.

A manually-adjustable electrical potentiometer is used to control current flow from the capacitor to ground. Thus, adjustable feedback is provided which results in either an occupant, a therapist, a parent, or another person being able to manually adjust the maximum torque of the motor drive.

In a first aspect of the present invention, a method is provided for separately and selectively adjusting both maximum speed and torque enhancement in an electrically propelled conveyance having an electric motor drive that propels the conveyance, and having an operator-actuated control that separately and selectively adjusts the speed of the electric motor drive, which method comprises operating the conveyance with the operator-actuated control in a maximum speed position; selectively adjusting the maximum speed while continuing the operating step; and selectively adjusting the torque enhancement while continuing the operating step.

In a second aspect of the present invention a method is provided for separately and selectively adjusting both maximum speed and torque enhancement in an electrically propelled conveyance having first and second reversible motor drives that propel the conveyance, that steer the conveyance when the speed of one of the motor drives is greater than the other, and that provide pivot turns when the speed of the motor drives is equal but opposite in direction, and having an operator-actuated control that separately and selectively adjusts the speed and direction of the motor drives, which method comprises operating the conveyance with the operator-actuated control in a position providing substantially equal and maximum speed for both motor drives; selectively adjusting the maximum speed while continuing the operating step; and selectively adjusting the torque enhancement.

In a third aspect of the present invention a method is provided for separately and selectively adjusting both maximum speed and torque enhancement in an electrically propelled conveyance having an electric motor drive that propels the conveyance, and having an operator-actuated control that separately and selectively adjusts the speed of the motor drive, which method comprises selectively adjusting the maximum speed; and selectively adjusting the torque enhancement.

In a fourth aspect of the present invention a method for controlling an electric motor comprises supplying an effective driving voltage to the motor that comprises driving voltage pulses that are disposed in respective ones of constant time periods; deriving a feedback signal that is motor-torque related during a selected part of the time periods; and increasing the width of the voltage pulses as a function of the derived signal.

Finally, in a fifth aspect of the present invention, an electric motor drive is provided which comprises: an electric motor; selectively variable speed control means, being operatively connected to a source of electrical power and to the electric motor, for supplying a selectively variable effective driving voltage to the motor; sampling means, being operatively connected to the electric motor, for deriving a motor-current-related feedback signal during selected portions of successive time periods; and feedback means, being operatively connected to the sampling means and to the variable speed control means, for increasing the effective driving voltage as a function of the feedback signal.

BRIEF DESCRIPTION OF THE DRAWINGS

FIG. 3 is a partial view of the power wheelchair of FIGS. 1 and 2, taken substantially as shown by view line 3—3 of FIG. 1, showing the control box with the control handle of the X-Y controller protruding upwardly therefrom, and showing the analog speed and torque adjustment knobs thereof;

FIG. 4 is a top view of the control box of FIG. 3, taken substantially as shown by view line 4—4 of FIG. 3, and with a portion broken away showing that the adjusting knobs attached to potentiometer shafts are disposed entirely inside the control box;

FIG. 5 is a front elevation of a prior art X-Y controller;

FIG. 6 is a top view of the X-Y controller of FIG. 5, taken substantially as shown by view line 6—6 of FIG. 5;

DESCRIPTION OF THE PREFERRED EMBODIMENTS

Figure 2:
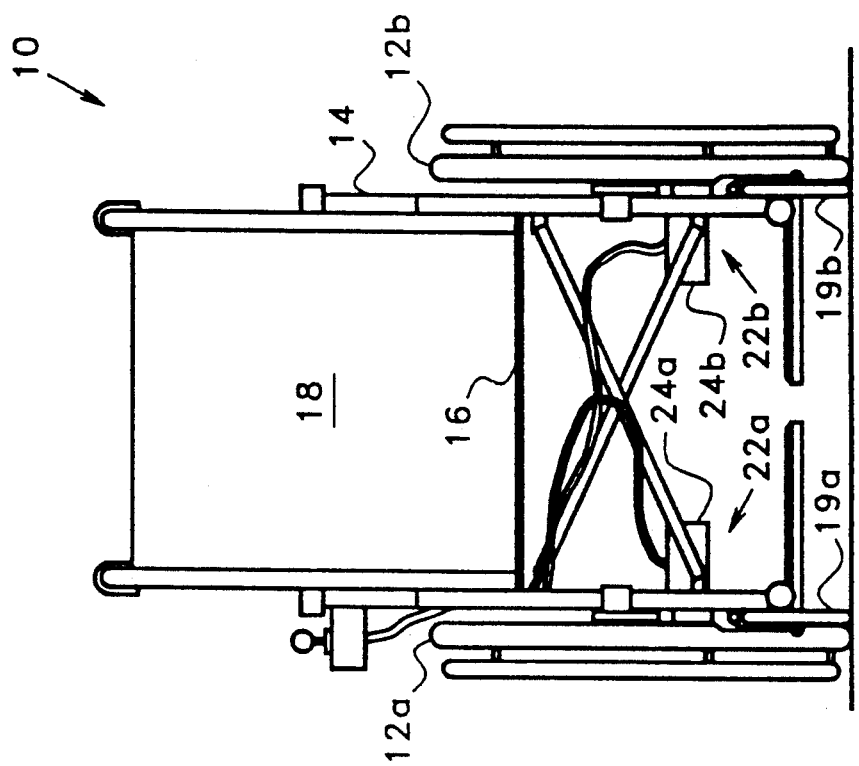
FIG. 2 is a front elevation of the power wheelchair of FIG. 1, taken substantially as shown by view line 2—2 of FIG. 1.
Figure 1:
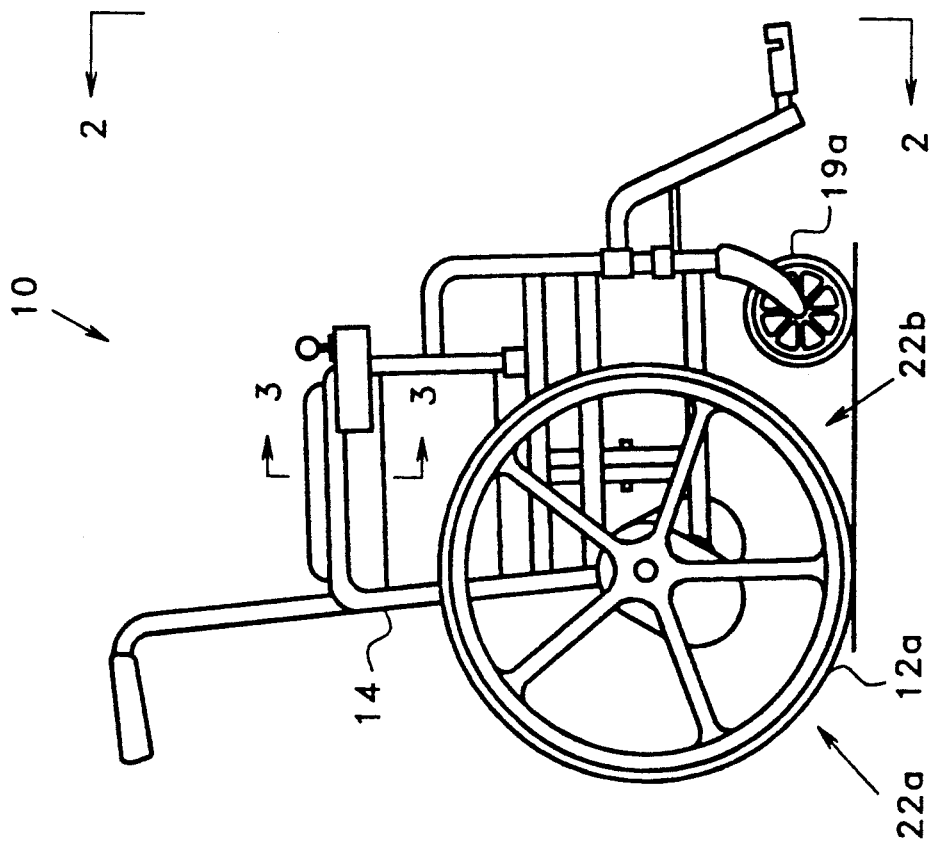
FIG. 1 is a side elevation of an electrically powered wheelchair with a pair of motor drives designed generally in accordance with the present invention.

Referring now to FIGS. 1 and 2, an electrically powered wheelchair, or a power wheelchair, or an electrically propelled conveyance, 10 includes right and left wheels, or first and second propulsion elements, 12a and 12b, a frame 14, a seat bottom 16, a seat back 18, castor wheels 19a and 19b, and footrests 20a and 20b. The wheelchair discussed thus far is typical to both manually powered and electrically powered wheelchairs of the prior art.

The power wheelchair 10 includes right and left mechanical drive units, 22a and 22b, which are generally mirror images of one another. The drive units 22a and 22b each connect an electric motor, 24a and 24b, to respective ones of the wheels, 12a and 12b. preferably, the drive units, 22a and 22b, are designed in accordance with the teachings of U.S. Pat. No. 4,978,899, and the mechanical efficiency of the drive units, 22a and 22b, cooperates with features of the electronic circuitry of U.S. Pat. No. 4,978,899 to allow the wheels 12a and 12b to reverse-drive the motors 24a and 24b when the circuitry is manually switched to a freewheeling mode.

Referring now to FIGS. 1-6, and more particularly to FIGS. 3-6, the power wheelchair 10 further includes a control box 26 with an X-Y controller, or operator-actuated control, 28 therein, and with a control handle 30 of the X-Y controller 28 extending upwardly therefrom. As shown in FIGS. 5 and 6, the X-Y controller 28 includes the control handle 30 that extends upwardly from a body 32, and transducers, or turn/speed potentiometers, 34a and 34b, that extend outwardly from the body 32.

Referring now to FIG. 6, the control handle 30 is movable in various directions and variable distances from a neutral position 36 at the intersection of X and Y axes. The control handle 30 is movable in a forward direction 38 along a Y axis to a maximum forward speed position 39 as shown in FIG. 4 to achieve forward propulsion, is movable rearward in a rearward direction 40 along the Y axis to achieve reverse propulsion, is movable at 45 degrees between the Y axis and an X axis, as shown by an arrow 42, to achieve a hard right turn with the left motor 24b operating at high speed and the right motor 24a stopped, is movable to the right along the X axis, as shown by an arrow 44, to achieve a pivot turn in which the left wheel 12b rotates in a forward direction and the right wheel 12a rotates in the reverse direction, and is movable in all directions from the neutral position 36 to achieve various maneuvers.

Figure 7:
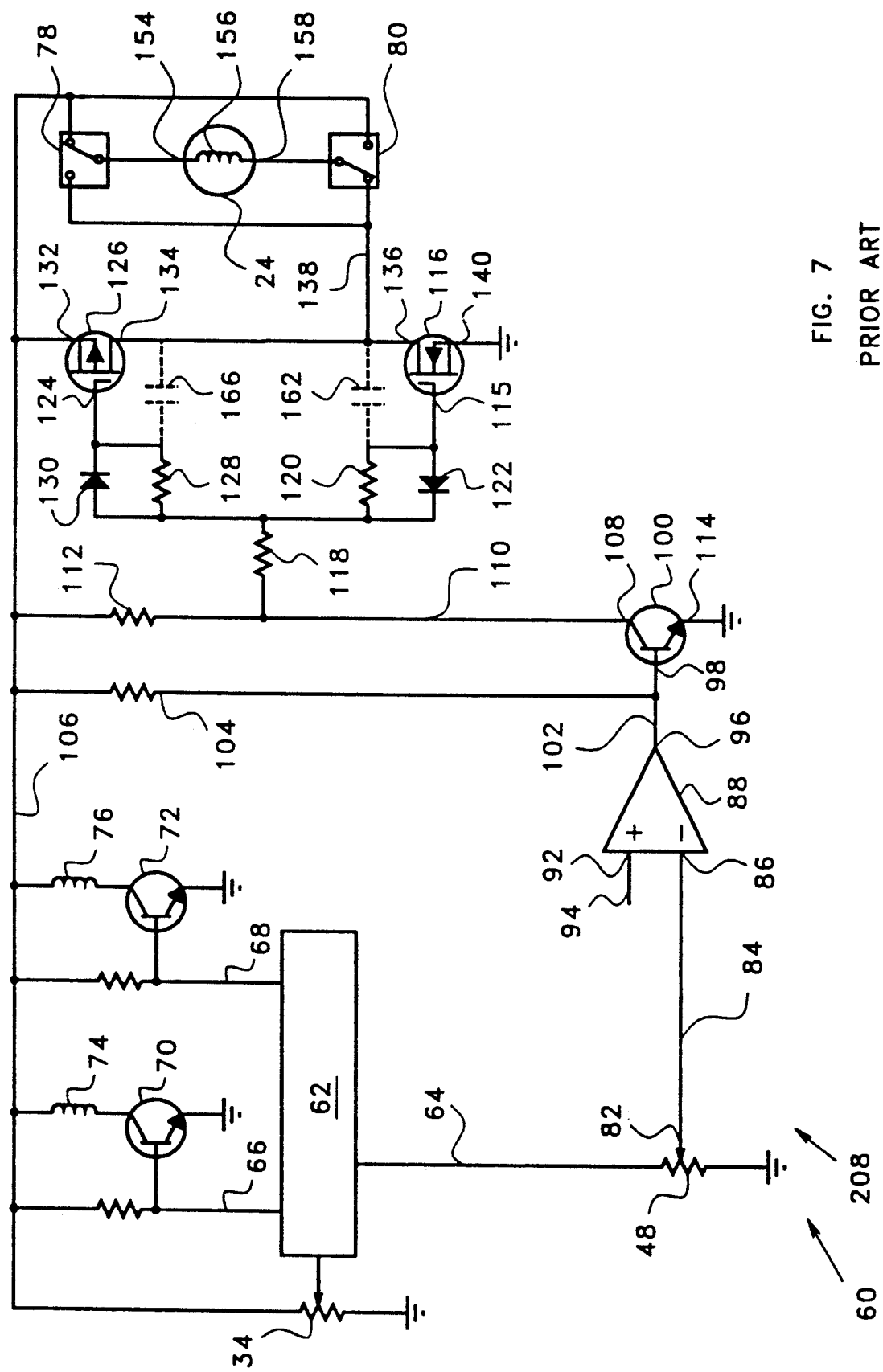
FIG. 7 is a schematic drawing of a prior art embodiment with a portion thereof that conforms to this prior art embodiment shown as a black box.
Figure 9:
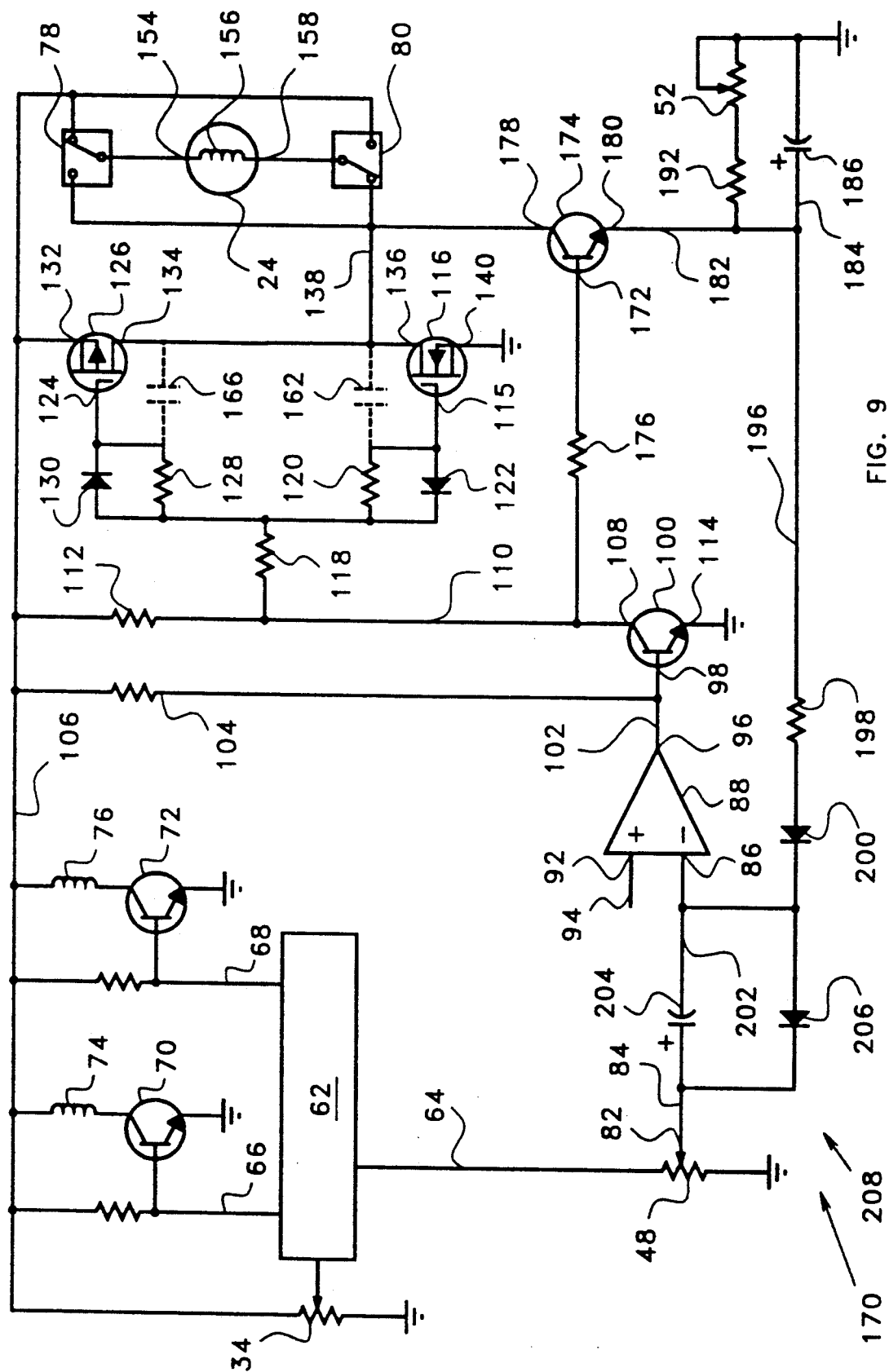
FIG. 9 is a schematic drawing of a preferred embodiment of the present invention with a portion shown as the black box of FIG. 7.

Referring to FIGS. 3, 4, 7, and 9, the control box 26 includes a removable speed control knob, or push-on knob, 46 that is removably attached to a maximum speed potentiometer 48 of FIG. 3, 7, and 9, and a removable torque control knob, or push-on knob 50 that is removably attached to a maximum torque potentiometer, a torque enhancement control, or boost potentiometer 52 of FIG. 9.

The maximum-speed potentiometer 48 and the boost potentiometer 52 are used to control the width of pulses of driving voltage that are applied to the motor 24a, and the speed control knob 46 also controls another maximum-speed potentiometer, not shown, which is ganged to the maximum-speed potentiometer 48, and another boost potentiometer, not shown, which is ganged to the boost potentiometer 52, to control the motor 24b.

Referring now to the prior art embodiment of FIG. 7, an electric motor drive, or reversible motor drive, 60 includes an electric motor 24. In the power wheelchair 10, two electric motor drives 60 are used, each of which includes an electric motor, 24a or 24b, and each of which includes a turn/speed potentiometer, 34a or 34b. However, for the sake of simplicity, in FIG. 7, each component is numbered without a letter suffix.

The electric motor drive 60 includes a black box 62 representing a group of components that are fully described in U.S. Pat. No. 4,906,906. The black box 62, in response to selective manual positioning of the potentiometer 34 of the X-Y controller by the control handle 30, produces a speed-control signal in a speed-control conductor 64 that is a D.C. voltage and that varies as a function of selective manual positioning of the control handle 30.

Further, in response to selective manual positioning of the control handle 30, the black box 62 also produces two direction-control signals, one in each of direction-control conductors 66 and 68. The direction-control signals of the direction-control conductors 66 and 68 cooperate with transistors 70 and 72, with relay coils 74 and 76, and with relays 78 and 80 to control the direction of rotation of the motor 24 by selectively reversing the voltage potential on the motor 24, as fully described in U.S. Pat. No. 4,906,906.

Continuing to refer to the prior art embodiment of FIG. 7, the maximum-speed potentiometer 48 is connected between the speed-control conductor 64 and ground, so that the maximum-speed potentiometer 48 functions as a voltage divider with the voltage of a wiper 82 thereof providing a speed-control voltage in a conductor 84 that is selectively proportioned by the maximum-speed potentiometer 48.

Figure 8:
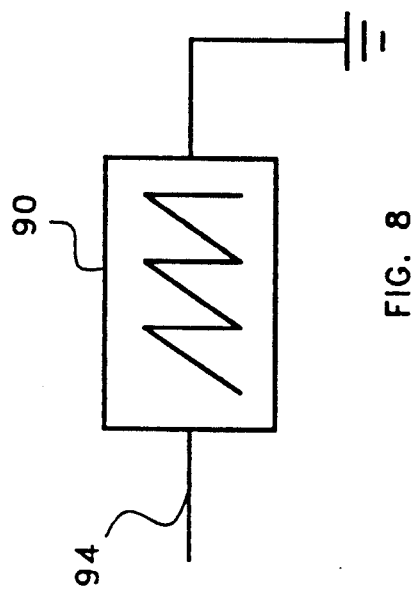
FIG. 8 is a box symbolizing a sawtooth generator for use with the circuitry of both FIGS. 7 and 9.

The speed-control voltage in the conductor 84 is connected to a negative terminal 86 of a comparator 88, and a sawtooth voltage from a sawtooth generator 90 of FIG. 8 is connected to a positive terminal 92 of the comparator 88 by a conductor 94. The comparator 88 produces an output at an output terminal 96 of the sawtooth generator 90 that is a pulsed voltage, and the width of the pulses are inversely proportional to the magnitude of the speed-control voltage.

That is, when the speed-control voltage is low, the output at the output terminal 96 is high for the entire period of the sawtooth, and, as the speed-control voltage increases, the output of the comparator 88 is low for proportionally longer portions of the period of the sawtooth.

The output terminal 96 of the comparator 88 is connected to a base 98 of an NPN transistor 100 by a conductor 102, and a pull-up resistor 104 is connected between the conductor 102 and a source conductor 106. A collector 108 of the transistor 100 is connected to the source conductor 106 by a conductor 110 and a resistor 112; and an emitter 114 of the transistor 110 is connected to ground.

The conductor 110 is connected to a gate 115 of an N-channel FET 116 by a resistor 118, and by a resistor 120 and a diode 122 that are connected in parallel, and the conductor 110 is connected to a gate 124 of a P-channel FET 126 by the resistor 118, and by a resistor 128 and a diode 130 that are connected in parallel.

A source 132 of the FET 126 is connected to the source conductor 106, a drain 134 of the FET 126 is connected to a source 136 of the FET 116 by a conductor 138, and a drain 140 of the FET 116 is connected to ground. In addition, the motor 24 is connected to the source conductor 106 via the relay 78, and the motor 24 is connected to the conductor 138, via the relay 80.

As mentioned previously, the relays 78 and 80 serve to reverse the potential applied to the motor 24. This reversibility can be understood by studying FIG. 7, and/or referring to U.S. Pat. No. 4,906,906. However, the reversing function is ignored in the discussion that follows, and the relays, 78 and 80 are considered communicating conductors and components as described.

Figure 10:
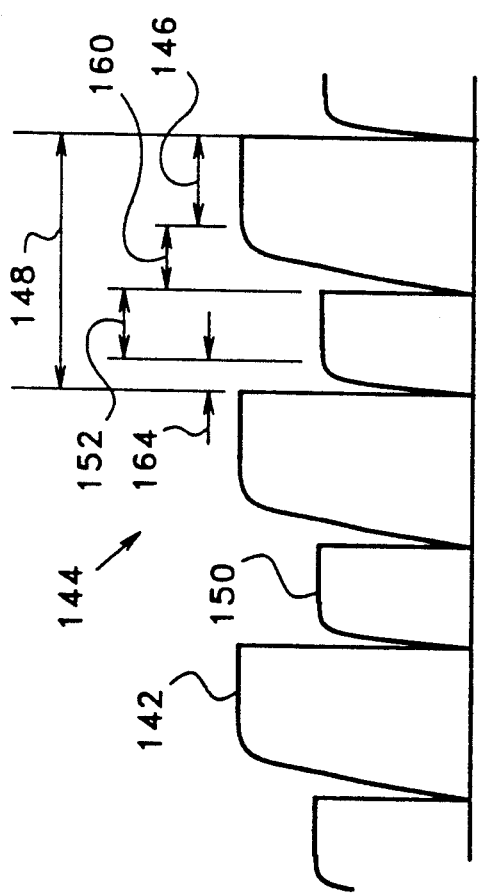
FIG. 10 is a graph showing dynamic braking pulses interposed with driving voltage pulses of a pulse-width-modulated driving voltage in respective ones of constant time periods.

Referring now to FIGS. 7 and 10, and more particularly to FIG. 10, the prior art system of FIG. 7 supplies driving voltage pulses, or spaced-apart voltage pulses, 142 of a pulse-width-modulated driving voltage, or effective driving voltage, 144 to the motor 24 whose pulse widths 146 are proportional to selective positioning of the potentiometer 34, as determined by selective positioning of the control handle 30. Further, this proportionality is modified, or attenuated, by the voltage dividing action of the maximum-speed potentiometer 48. Each of the driving voltage pulses 142 is disposed in a constant time period 148 that is identical to the period of the sawtooth generator 90.

Further, the prior art system of FIG. 7 provides dynamic braking pulses 150 whose pulse widths 152 are inversely proportional to the pulse widths 146 of the driving voltage pulses 142. The pulse widths 152 of the dynamic braking pulses 150, together with the pulse widths 146 of the driving voltage pulses, equal the period, except for switching times of the FETS, 116 and 126, as will be described subsequently.

In operation, a low at the output terminal 96 of the comparator 88 places a low on the base 98 of the NPN transistor 100, the transistor 100 is in a nonconductive state, a high is applied to the gate 115 of the N-channel FET 116 via the resistors 112, 118, and 120, the N-channel FET 116 turns on, and a motor drive circuit is established from the source conductor 106 to the ground via the relay 78, a motor terminal 154 of the motor 24, a motor coil 156, a motor terminal 158, the relay 80, and the FET 116.

When the output terminal 96 of the comparator 88 places a high on the base 98 of the NPN transistor 100, the transistor 100 turns on, pulling the voltage down in the conductor 110, and placing a low on the P-channel FET 126 via the resistors 118 and 128, and thereby switching the P-channel FET 126 to its conducting condition. At this time, the motor 24 is shorted by a flow path that includes the motor terminal 158, the relay 80, the conductor 138, the FET 126, the source conductor 106, the relay 78, the motor terminal 154, and the motor coil 156.

At this time, the output voltage of the motor 24 is generally equal to the voltage drops of the FET 126, and the voltage generated by the motor 24 being shorted and functioning as a generator includes both the voltage drop of the FET 126 and the internal voltage drop of the motor 24.

It is imperative that the FETS, 116 and 126 do not, even for a short time, conduct simultaneously. The prior art embodiment of FIG. 7 includes circuity to prevent this from occurring by increasing switching-on time of both FETS, 116 and 126.

More particularly, a delay 160 in switching on the N-channel FET 116 is provided by the resistor 120 and the inherent capacitance of the FET 116, as indicated by a phantom capacitor 162, since current flow through the resistor 120 increases the time required to charge the phantom capacitor 162 and raise the voltage applied to the gate 115. However, switching off the FET 116 is not delayed because the phantom capacitor 162 is discharged through the diode 122 which bypasses the resistor 120. Thus, as shown in FIG. 10, there is a delay 160, following a braking pulse 150, before the FET 116 is fully conductive.

Also, a delay 164 in switching on the P-channel FET 126 is provided by the resistor 128 and the inherent capacitance of the FET 126, as indicated by a phantom capacitor 166, since current flow through the resistor 128 increases the time required to discharge the phantom capacitor 166 and lower the voltage applied to the gate 124. However, switching off the FET 126 is not delayed because the phantom capacitor 166 can be charged through the diode 130 which bypasses the resistor 128. Thus, as shown in FIG. 10, there is a delay 164, following a driving voltage pulse 142, before the FET 126 is fully conductive.

Referring now to FIG. 9, in a preferred embodiment of the present invention, an electric motor drive, or reversible motor drive, 170 includes like-named and like numbered components as described in conjunction with the prior art embodiment of FIG. 7, and the embodiments of FIGS. 7 and 9 function the same, except as will be described.

As described previously, during a driving pulse, the NPN transistor 100 is in a nonconductive state, a high is in the conductor 110 and at the gate 115 of the N-channel FET 116, and the FET 116 completes a circuit from the source conductor 106, through the motor 24, to ground.

At this time, the conductor 110 places a high on a base 172 of an NPN transistor 174 via a resistor 176, switching the transistor 174 to its conductive state, and thereby providing a current flow path from the source terminal 136 of the FET 116 to ground via the conductor 138, a collector 178 of the transistor 174, an emitter 180 of the transistor 174, conductors 182 and 184, and a capacitor 186.

While a driving voltage pulse 142 is being supplied to the motor 24, the voltage in the conductor 138 is above ground potential by only 0.7 volts, or so. Therefore, the voltage of the collector 178 is about 0.7 volts with respect to ground, the voltage on the base 172 is considerably higher, and current flows from the base 172 to the capacitor 186 via the emitter 180. The relationship of this current flow into the capacitor 186 to the present invention will be described subsequently.

When a dynamic braking pulse 150 occurs, the conductor 110 is low, the voltage to the base 172 of the transistor 174 is low, and the transistor 174 is nonconductive.

Subsequent to a dynamic braking pulse 150, a high in the conductor 110 switches both the N-channel FET 114 and the NPN transistor 174 to their respective conducting states. However, as described previously, the resistor 120 cooperates with the phantom capacitor 162 to delay switching on the FET 116.

Figure 11:
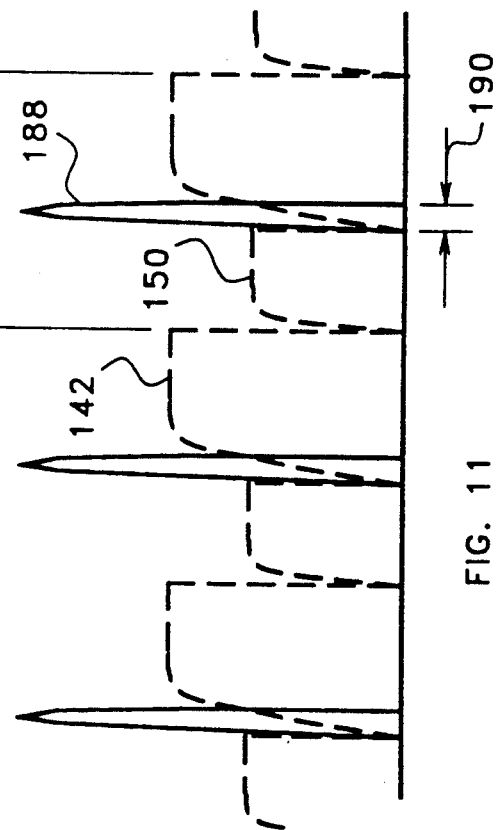
FIG. 11 is a graph illustrating time and current flow of the torque-sensitive feedback signal superimposed on phantom representations of the driving voltage pulses and dynamic braking pulses of FIG. 10, and the time relationship of the feedback signal to the time periods of FIG. 10.

However, there is no comparable delay in switching time for the transistor 174. Thus, before the FET 116 is conductive, or fully conductive, the transistor 174 provides a motor torque-sensitive circuit from the motor 24 to ground via the capacitor 186. This torque-sensitive circuit provides a short, but intense, torque-sensing current, or motor-current-related feedback signal, 188, as shown in FIG. 11, that flows into the capacitor 186. As shown in FIG. 11, the torque-sensing current 188 has a pulse width, or portion, 190, and the torque-sensing signal is disposed generally intermediate of a dynamic braking pulse 150 and a driving voltage pulse 142.

The voltage charge of the capacitor 186 is a function of the combined current flow of the torque-sensing current 188 and the current flow, as previously described, between the base 172 and the emitter 180 of the transistor 174 when the conductor 138 is connected to ground by the FET 116. Also, the voltage charge of the capacitor 186 is a function of a resistor 192 and the maximum torque potentiometer 52 which cooperate to selectively bleed off the charge of the capacitor 186 to ground.

The voltage of the capacitor 186 is applied to the comparator 88 to selectively enhance the torque of the motor 24 by increasing the pulse widths 146 of the driving voltage 144 by a function that is selectively determined by selective adjustment of the potentiometer 52.

Summing of the voltage of the capacitor 186 with the speed-control voltage from the maximum speed potentiometer 48 is achieved by a feedback conductor 196, a resistor 198, a diode 200, a conductor 202, and the combination of a capacitor 204 and a diode 206 that are in parallel between the conductor 202 and the conductor 84.

In operation, the diodes 206 and 200 prevent the maximum-speed signal in the conductor 84 from being reduced to the potential of the capacitor 186 when the voltage of the capacitor 186 is low, the diode 200 prevents the summed signal in the conductor 202 from being reduced to the potential of the capacitor 186 when the voltage of the capacitor 186 is low, and the capacitor 204 provides summing isolation between the speed and torque signals of the conductors 84 and 196, respectively.

In addition, the diode 206 serves as means for limiting torque enhancement. That is, since the diode 206 conducts at voltage differences greater than 0.7 volts, the motor-current-related feedback signal 188 cannot increase the voltage applied to the negative terminal 86 of the comparator 88 by more than 0.7 volts above the instantaneous voltage selected by manual positioning of the wiper 84.

In summary, referring now to FIGS. 1, 2, 5, 6, 8, and 9, the power wheelchair 10 includes right and left wheels, 12a and 12b, right and left mechanical drive units 22a and 22b that connect the wheels 12a and 12b to right and left motors, 24a and 24b, respectively, and a pair of the electric motor drives, 170, each of which includes an electric motor 24a or 24b, and each of which includes a speed/turn potentiometer 34a or 34b of the X-Y controller 28.

Referring now to FIGS. 9, 10 and 11, the present invention provides means, included in the electric motor drive 170, for providing a pulse-width-modulated driving voltage 144 with dynamic braking pulses 150 interposed between respective ones of driving voltage pulses 142.

Also, the present invention provides sampling means, comprising an NPN transistor 174, for deriving a motor-current-related feedback signal 188 during selected portions 190 of the constant time periods 148. More particularly, the feedback signal 188 is derived in a portion 190 of the constant time periods 148 which is separate from the driving voltage pulses 142 thereof. Even more particularly, the feedback signal 188 is derived generally subsequent to one of the dynamic braking pulses 150 and the succeeding one of the driving voltage pulses 142 in the delay 160 that is disposed therebetween.

Further, the present invention provides feedback means, including the resistor 198, the diodes 200 and 206, and the capacitor 204, for increasing the effective driving voltage 144 by increasing the pulse widths 146 of the driving voltage pulses 142. A variable speed control 208 of FIG. 7 includes all of the components of the electric motor drive 60 with the exception of the motor 24, and the variable speed control 208 is used, together with components as described previously in the electric motor drive 170 of the present invention.

In addition, the present invention provides means, including a removable speed control knob 46 and a pair of maximum speed potentiometers 48, for selectively adjusting the maximum speed of the motors 24 and the conveyance 10 by selectively limiting the maximum pulse width 146 of the driving voltage pulses 142. As is apparent, selective adjustment of the maximum speed potentiometer 48, provides analog, rather than digital, adjustment of maximum speed.

Finally, the present invention provides means, including a removable torque control knob 50 and a maximum torque potentiometer 52, for selectively adjusting the maximum torque of the motors 24 and the conveyance 10 by increasing the effective driving voltage 144. Further, this means for selectively adjusting the maximum torque includes increasing the pulse width 146 of the driving voltage pulses 142 as a function of adjustment of the torque control knob 50. As is apparent, selective adjustment of the maximum torque potentiometer 48 provides analog, rather than digital, adjustment of maximum torque.

That is, the maximum speed of the electric motor drive 170, and the power wheelchair 10, may be selectively adjusted by an occupant of the power wheelchair 10 or by someone standing, or walking, outside the power wheelchair 10, by attaching and selectively turning the removable speed control knob 46. In like manner, torque enhancement of the electric motor drive 170, and of the power wheelchair 10, may be selectively adjusted by an occupant of the power wheelchair 10, or by someone standing, or walking, outside the power wheelchair 10, by attaching and selectively turning the removable torque control knob 50. Then, if it is desirable to prevent the occupant or passerby from tampering with the preselected settings of maximum speed and torque enhancement, the knobs, 46 and 50, are removed to inactivate selective adjustment, and the knobs 46 and 50, are placed in safekeeping.

The method of using the present invention includes placing a handicapped person in the conveyance 10, operating a conveyance with the control handle 30 of the operator-actuated control 20 in the maximum forward speed position 39, selectively adjusting the maximum speed of the conveyance while continuing the operating step, and selectively adjusting the torque enhancement control while continuing the operating step.

Further, the method of using the present invention optionally includes making an analog adjustment; selectively adjusting a variable resistance; increasing the load on the motor drive subsequent to the first adjusting step and prior to the second adjusting step; operating the conveyance on a relatively hard surface during the first adjusting step; operating the conveyance on a relatively soft surface during the second adjusting step; driving the conveyance up an inclined surface during the second adjusting step; making a turn during the second adjusting step; making a pivot turn during the second adjusting step; walking beside the conveyance during one of the adjusting steps; and/or being outside the conveyance during both of the adjusting steps.

Alternately, the method of using the present invention includes selectively adjusting the maximum speed of a conveyance; selectively adjusting torque enhancement; adjusting the width of pulses of a pulse-width-modulated driving voltage within constant time periods; determining the maximum increase in the width of the pulses that occurs with an increase in load; and/or making an analog adjustment.

The method of the present invention includes supplying an effective driving voltage to a motor that comprises spaced-apart voltage pulses disposed in respective ones of time periods; deriving a feedback signal that is motor-torque related during a selected part of the time periods; and increasing the width of the voltage pulses as a function of the derived signal. Optionally, the selected part of the time periods includes a portion thereof that is disposed intermediate of the voltage pulses.

In prior art electric motor drives, a load-sensing resistor has been placed in series with the electric motor, and load sensing has been done during the entire period of the driving voltage. This series placement of the load-sensing resistor has required that this resistor be of low resistance in order to minimize power loss in the load-sensing resistor, this low resistance of the load-sensing resistor has resulted in a signal so low in magnitude that it has been unduly susceptible to contamination by electrical noise. These problems have been aggravated by the load-sensing resistor sensing the entire period of the driving voltage, including no-voltage spaces between the driving voltage pulses, thereby attenuating a signal that is already marginal in magnitude.

In contrast, in the present invention, the torque load of the electric motor 24 is sensed without any load-sensing resistor at all. Therefore, a torque-sensitive signal can be, and is, produced that is much greater in magnitude than that produced by prior art electric motor drives, and therefore much less sensitive to noise. Further, since a load-sensing resistor is not used, as can be seen by examination of the embodiment of FIG. 9, the magnitude of the load-sensitive signal is a matter of design choice.

Further, in the present invention, load sensing is accomplished in portions 190 of the constant time periods 148 other than when pulses 142 of the pulse-width-modulated driving voltage 144 are being supplied to the electric motor 24. For pulse-width-modulated systems, this sensing can be done during any portion of the time period 148 between driving voltage pulses 142. However, in electric motor drives using pulse-width-modulated driving voltages and having dynamic braking pulses 150 interposed intermediate of the driving voltage pulses 142, torque sensing is accomplished subsequent to a dynamic braking pulse 150 and before the succeeding driving voltage pulse 142 during a delay 160 provided in the switching-on time of the FET 116 which controls pulses 142 of the driving voltage 144.

Therefore, the present invention avoids the aforementioned limitations and difficulties encountered by prior art electric motor drives utilizing an effective driving voltage that includes spaced-apart driving voltage pulses 142 whether the effective driving voltage be pulse-width or frequency-modulated. The present invention achieves the aforementioned advantages by sensing motor current in a novel manner and during selected portions 190 of the time periods 148.

It is important to notice that, with the current-related feedback signal 188 disposed in a portion 190 of the time periods 148 separate from the driving voltage pulses 142, the voltage applied to the motor 24 during the portions 190 becomes pulses of driving voltage that are separate from, and distinct from, the driving voltage pulses 142. Thus, the power of the current flow and voltage during the portions 190 produces motor torque that adds to the average torque of the motor 24 which is produced by the driving voltage pulses 142.

While specific apparatus and method have been disclosed in the preceding description, and while part numbers have been inserted parenthetically into the claims to facilitate understanding of the claims, it should be understood that these specifics have been given for the purpose of disclosing the principles of the present invention and that many variations thereof will become apparent to those who are versed in the art. Therefore, the scope of the present invention is to be determined by the appended claims, and without any limitation by the part numbers inserted parenthetically in the claims.

Industrial Applicability

The present invention is applicable to electric motor drives, and to various power propelled conveyances whether personnel or cargo carriers, to health care devices such as power wheelchairs, and especially to power wheelchairs for pediatric and geriatric use.

What is claimed is:

1. A method for separately and selectively adjusting both maximum speed and torque enhancement in an electrically propelled conveyance having an electric motor drive that propels said conveyance, and having an operator-actuated control that selectively adjusts the speed of said electric motor drive, which method comprises:
    a) electrically propelling said conveyance;
    b) selectively adjusting said maximum speed that is attainable by selective positioning of said operator-actuated control;
    c) changing the propulsion load on said motor drive from a first propulsion load to a second propulsion load;
    d) selectively adjusting said torque enhancement as a function of changes in speed resulting from said changing step;
    e) being outside said conveyance during one of said selective adjusting steps; and
    f) walking beside said conveyance during one of said selective adjusting steps.

2. A method as claimed in claim 1 in which one of said selective adjusting steps comprises making an analog adjustment.

3. A method as claimed in claim 1 in which said changing step comprises increasing the load on said motor drive subsequent to the first said adjusting step and prior to the second said adjusting step.

4. A method as claimed in claim 1 in which said changing step comprises:
    a) operating said conveyance on a relatively hard surface during the first said adjusting step; and
    b) operating said conveyance on a relatively soft surface during the second said adjusting step.

5. A method as claimed in claim 1 in which said changing step comprises driving said conveyance up an inclined surface during the second said adjusting step.

6. A method as claimed in claim 1 in which one of said selective adjusting steps comprises selectively adjusting a variable resistance.

7. A method as claimed in claim 1 in which said method further comprises electrically propelling said conveyance during said selective adjusting of said maximum speed.

8. A method as claimed in claim 1 in which said method further comprises electrically propelling said conveyance during said changing step.

9. A method as claimed in claim 1 in which said method further comprises electrically propelling said conveyance during said selective adjusting of said torque enhancement.

10. A method as claimed in claim 1 in which said method further comprises propelling said conveyance during said changing step and both of said selective adjusting steps.

11. A method as claimed in claim 1 in which said method further comprises selectively preventing either of said selective adjusting steps.

12. A method as claimed in claim 1 in which said method further comprises:
    a) selectively preventing one of said adjusting steps; and
    b) said selectively preventing step comprises removing an adjusting knob.

13. A method for separately and selectively adjusting both maximum speed and torque enhancement in an electrically propelled conveyance having first and second reversible motor drives that propel said conveyance, that steer said conveyance when the speed of one of said motor drives is greater than the other, and that provide pivot turns when the speed of said motor drives is equal but opposite in direction, and having an operator-actuated control that separately and selectively adjusts the speed and direction of said motor drives, which method comprises:
    a) operating said conveyance with said operator-actuated control in a position providing substantially equal and maximum speed for both motor drives;

b) selectively adjusting said maximum speed while continuing said operating step; and c) selectively adjusting said torque enhancement.

14. A method as claimed in claim 13 in which each of said selective adjusting steps comprises making an analog adjustment.

15. A method as claimed in claim 14 in which one of said selective adjusting steps comprises selectively adjusting a variable resistance.

16. A method as claimed in claim 13 in which method further comprises making a turn during the second adjusting step.

17. A method as claimed in claim 13 in which said method further comprises making a pivot turn during the second adjusting step.

18. A method as claimed in claim 13 in which said method further comprises:

a) being outside said conveyance during both of said adjusting steps;

b) increasing the load on said motor drives subsequent to the first adjusting step and prior to the second adjusting step; and c) walking beside said conveyance during one of said adjusting steps.

19. A method as claimed in claim 13 in which said method further comprises:

a) operating said conveyance on a relatively hard surface during the first adjusting step;

b) operating said conveyance on a relatively soft surface during the second adjusting step;

c) being outside said conveyance during both of said adjusting steps; and d) walking beside said conveyance during one of said adjusting steps.

20. A method as claimed in claim 13 in which said method further comprises:

a) being outside said conveyance during both of said adjusting steps;

b) walking beside said conveyance during one of said adjusting steps; and c) driving said conveyance up an inclined surface during the second adjusting step.

21. A method as claimed in claim 13 in which said method further comprises increasing the load on one of said motor drives subsequent to the first adjusting step and prior to the second adjusting step.

22. A method for separately and selectively adjusting both maximum speed and torque enhancement in an electrically propelled conveyance having an electric motor drive that propels said conveyance, and having an operator-actuated control that selectively adjusts the speed of said motor drive, which method comprises:

a) selectively adjusting the pulse widths of a pulse-width-modulated driving voltage, said pulse widths are disposed within constant time periods; and b) selectively adjusting the maximum increase in said pulse widths as a function of load on said motor drive.

23. A method as claimed in claim 22 in which said method further comprises increasing said load on said motor drive subsequent to the first said selective adjusting step and prior to the second said selective adjusting step.

24. A method as claimed in claim 22 in which said method further comprises:

a) operating said conveyance on a relatively hard surface during the first said selective adjusting step; and b) operating said conveyance on a relatively soft surface during the second said selective adjusting step.

25. A method as claimed in claim 22 in which said method further comprises driving said conveyance up an inclined surface during the second said selective adjusting step.

26. A method as claimed in claim 22 in which said method further comprises walking beside said conveyance during one of said adjusting steps.

27. A method as claimed in claim 22 in which said method further comprises:

a) being outside said conveyance during both of said adjusting steps; and b) walking beside said conveyance during one of said adjusting steps.

28. A method as claimed in claim 22 in which one of said adjusting steps comprises making an analog adjustment.

29. A method for controlling an electric motor which comprises:

a) supplying an effective an effective driving voltage to said motor that comprises driving voltage pulses that are disposed in respective ones of constant time periods;

b) deriving a feedback signal that is motor-torque related during a selected part of said constant time periods; and c) increasing the width of said voltage pulses as a function of said derived signal.

30. A method as claimed in claim 29 in which said selected part of said time periods includes a portion thereof that is disposed intermediate of said driving voltage pulses.

31. A method as claimed in claim 29 in which said selected part of said constant time periods includes a portion thereof that is disposed in said driving voltage pulses.

32. A method as claimed in claim 29 in which said selected part of said constant time periods includes a portion thereof that is disposed intermediate of said driving voltage pulses; and said method further comprises deriving a portion of said feedback signal during said supplying of said effective driving voltage.

33. A method as claimed in claim 29 in which said selected part of said constant time periods includes a portion thereof that is disposed intermediate of said driving voltage pulses;

said method further comprises deriving motor-current related feedback signals during a portion of said supplying of said effective driving voltage; and said method still further comprises summing said feedback signals.

34. An electric motor drive (170) which comprises:

an electric motor (24);

selectively variable speed control means (208), being operatively connected to a source (106) of electrical power and to said electric motor, for supplying a selectively variable effective driving voltage (144) to said motor;

sampling means (174), being operatively connected to said electric motor, for deriving a motor-current-related feedback signal (188) during selected portions (190) of successive time periods (148); and feedback means (198, 200, 202, 204, 206), being operatively connected to said sampling means and to said variable speed control means, for increasing said effective driving voltage as a function of said feedback signal.

35. An electric motor drive (170) as claimed in claim 34 in which said electric motor drive further comprises:
   means (46, 48) for selectively adjusting the maximum speed of said electric motor drive; and
   means (50, 52) for selectively adjusting the maximum torque of said electric motor drive.

36. An electric motor drive (170) as claimed in claim 34 in which said effective driving voltage comprises a pulse-width-modulated driving voltage (144) that includes driving voltage pulses (142) disposed in respective ones of constant time periods (148); and
   said feedback means comprises means for increasing the pulse width (146) of said driving voltage pulses.

37. An electric motor drive (170) as claimed in claim 34 in which:
   said effective driving voltage comprises a pulse-width-modulated driving voltage (144) that includes driving voltage pulses (142) disposed in respective ones of constant time periods (148);
   said feedback means comprises means for increasing the pulse width (146) of said driving voltage pulses;
   said motor drive further includes means (48, 50) for manually attenuating said pulse widths; and
   said motor drive still further includes means for adjusting the proportionality between said feedback signal (188) and said increasing of said pulse widths.

38. An electric motor drive (170) as claimed in claim 34 in which said effective driving voltage (144) comprises spaced-apart pulses of a driving voltage; and
   said selected portions (190) are disposed between said pulses.

39. An electric motor drive (170) as claimed in claim 34 in which said effective driving voltage (144) comprises spaced-apart pulses of a driving voltage; and
   said selected portions (190) are disposed in said pulses.

40. An electric motor drive (170) as claimed in claim 34 in which said effective driving voltage (144) comprises spaced-apart pulses of a driving voltage;
   said selected portions (190) are disposed between said pulses;
   said electric motor drive further comprises second means for deriving said motor-current related feedback signal (188) during said selected portions (190) of said successive time periods (148); and
   said selected portions of said second means are disposed in said pulses.

41. An electric motor drive (170) as claimed in claim 34 in which said effective driving voltage (144) comprises spaced-apart pulses of a driving voltage;
   said selected portions (190) are disposed between said pulses;
   said electric motor drive further comprises second means for deriving a second said motor-current related feedback signal (188) during said selected portions (190) of said successive time periods (148);
   said selected portions of said second means are disposed in said pulses; and
   said feedback means (198, 200, 202, 204, 206) comprises means for summing said current-related feedback signals.

* * * * *